United States Patent
Ogino et al.

(10) Patent No.: US 7,420,340 B2
(45) Date of Patent: Sep. 2, 2008

(54) MOTOR SPEED CONTROL CIRCUIT

(75) Inventors: Koichiro Ogino, Ota (JP); Takashi Harashima, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/468,277

(22) Filed: Aug. 29, 2006

(65) Prior Publication Data

US 2007/0046229 A1    Mar. 1, 2007

(30) Foreign Application Priority Data

Aug. 31, 2005    (JP) .............................. 2005-252789

(51) Int. Cl.
*H02K 19/00* (2006.01)
(52) U.S. Cl. .............................. 318/268; 327/77; 327/87
(58) Field of Classification Search .................. 318/268
See application file for complete search history.

(56) References Cited

U.S. PATENT DOCUMENTS

| | | | |
|---|---|---|---|
| 7,098,799 B2 * | 8/2006 | Imai et al. .................... | 340/660 |
| 7,106,107 B2 * | 9/2006 | Bhattacharya et al. ........ | 327/77 |

FOREIGN PATENT DOCUMENTS

JP    2003-204692    7/2003

* cited by examiner

*Primary Examiner*—Lincoln Donovan
*Assistant Examiner*—Michael Brandt
(74) *Attorney, Agent, or Firm*—SoCal IP Law Group LLP; Steven C. Sereboff; John E. Gunther

(57) ABSTRACT

A motor speed control circuit which controls a rotational speed of a motor by controlling an amount of current flowing through a drive coil of the motor. The control circuit comprises a reference voltage circuit that generates a reference voltage corresponding to a speed-specifying signal inputted to specify the rotational speed of the motor; a clamp circuit that limits a level of the reference voltage generated by the reference voltage circuit; a comparator that has a speed voltage corresponding to an actual rotational speed of the motor and the reference voltage limited in level by the clamp circuit applied thereto and compares the two; and a control signal generator that generates and outputs a control signal for controlling the amount of current flowing through the drive coil based on the comparing result of the comparator.

8 Claims, 9 Drawing Sheets

| COMPARATOR INPUT | CONTROL SIGNAL VC | Accelerate/Decelerate Motor |
|---|---|---|
| VR2<VV | L | Acceleration |
| VR2>VV | H | Deceleration |

MOTOR SPEED CONTROL CIRCUIT

CROSS-REFERENCE TO RELATED APPLICATIONS

The present application claims priority from Japanese Patent Application No. 2005-252789 filed on Aug. 31, 2005, which is herein incorporated by reference.

BACKGROUND OF THE INVENTION

1. Field of the Invention

The present invention relates to a motor speed control circuit.

2. Description of the Related Art

Various electronic apparatuses have an exothermic body that generates heat when the electronic apparatus operates. To cool this exothermic body, a fan motor is usually provided. For example, in personal computers, servers and the like, the operating frequencies of the CPUs become increasingly high year by year causing the heat values of the CPUs to increase. Accordingly, a fan motor for cooling the CPU and a motor driver to drive the fan motor is usually provided in personal computers, servers and the like. As a speed control method for fan motors, a speed servo control method has been proposed which has a PWM drive method combined therewith as shown, e.g., in FIG. 10 (refer, for example, to Japanese Patent Application Laid-Open Publication No. 2003-204692).

To describe in detail, a rotational speed detection signal obtained from a pulse generator PG of a motor 1 is supplied to an operational amplifier 7 for generating a speed voltage. The output of this operational amplifier 7 is integrated by an RC filter circuit to produce a direct-current speed voltage VV, which is applied to the inverting input terminal of a comparator 9. Furthermore, a PWM (Pulse Width Modulation) signal set by a CPU 5 is supplied to an operational amplifier 6 for generating a reference voltage. The PWM signal sets the rotational speed of the motor 1 via its duty ratio. The output of the operational amplifier 6 is integrated by an RC filter circuit to produce a direct-current reference voltage VR1, which is applied to the non-inverting input terminal of the comparator 9.

The comparator 9 compares the speed voltage VV applied to the inverting input terminal and the reference voltage VR1 applied to the non-inverting input terminal, and produces and outputs a control signal VC as the comparing result. A motor driver 11 causes the amount of current corresponding to the control signal VC from the comparator 9 to flow through the drive coil of the motor 1 thereby controlling the rotational speed of the motor 1. Furthermore, a hall element 13 is provided for the stator of the motor 1, and the motor driver 11 controls the rotational direction of the motor 1 by switching the direction of the current flowing through the drive coil of the motor 1 on the basis of the hall element output of the hall element 13 indicating the detected position of the rotor.

As such, in order to perform speed servo control of the fan motor, as shown in FIG. 10, there is usually provided circuitry that is equivalent to the operational amplifier 7 that generates the speed voltage VV indicating the detected, actual rotational speed of the motor 1, the operational amplifier 6 that generates the reference voltage VR1 of a level according to a motor rotational speed-specifying signal such as the PWM signal, and the comparator 9 that compares the speed voltage VV supplied from the operational amplifier 7 and the reference voltage VR1 supplied from the operational amplifier 6.

The comparator 9 is usually an operational amplifier in configuration as shown in FIG. 10. To describe in detail, the comparator 9 comprises a differential transistor pair (T1, T2), a constant current source T3 provided on the ground voltage GND side of the differential transistor pair (T1, T2), and a current mirror circuit (T4, T5) provided on the bias voltage VREG side of the differential transistor pair (T1, T2). That is, the current mirror circuit (T4, T5), the differential transistor pair (T1, T2), and the constant current source T3 are connected in series between the bias voltage VREG and the ground voltage GND. Note that depending on the type of transistors, the constant current source T3 may be provided on the bias voltage VREG side of the differential transistor pair (T1, T2) and that the current mirror circuit (T4, T5) may be provided on the ground voltage GND side of the differential transistor pair (T1, T2).

The problem to be solved by the invention will be explained below using as an example the motor speed control system shown in FIG. 10 with reference to FIG. 11.

The non-inverting and inverting inputs of the comparator 9 are connected to the base electrodes of the differential transistor pair (T1, T2). The current mirror circuit (T4, T5) is provided on the bias voltage VREG side of the differential transistor pair (T1, T2) and the constant current source T3 is provided on the ground voltage GND side of the differential transistor pair (T1, T2). In this case, the allowable range of voltage to be applied between the non-inverting and inverting inputs of the comparator 9 is supposed to be ideally the range of from the bias voltage VREG to the ground voltage GND.

However, the upper level limit for the non-inverting and inverting inputs of the comparator 9 is lower by at least a collector-to-emitter saturation voltage VCE(sat) of the current mirror circuit (T4, T5) than the bias voltage VREG. Also, the lower level limit for the non-inverting and inverting inputs of the comparator 9 is higher by at least a collector-to-emitter saturation voltage VCE(sat) of the constant current source T3 than the ground voltage GND. As a result, the allowable range of voltage to be applied between the non-inverting and inverting inputs of the comparator 9 is limited. This limited, applied voltage range is generally called a common-mode input voltage range.

Here, on the premise that the comparator 9 has the common-mode input voltage range as an electrical characteristic, consider a case where the duty ratio of the PWM signal is varied from 0% to 100%. In this case, the reference voltage VR1 applied to the non-inverting input of the comparator 9 varies in level approximately from the ground voltage GND to the bias voltage VREG in response to the change in the duty ratio of the PWM signal. However, since being subject to limitation of the common-mode input voltage range, the non-inverting input of the comparator 9 cannot respond to all changes in the reference voltage VR1 corresponding to the change in the duty ratio of the PWM signal. That is, there is the problem that the range of from 0% to 100% for the PWM signal duty ratio is partly outside the common-mode input voltage range as an electrical characteristic of the comparator 9 and in this case, the comparator 9 does not operate correctly.

SUMMARY OF THE INVENTION

According to a main aspect of the present invention to solve the above problem, there is provided a motor speed control circuit which controls a rotational speed of a motor by controlling the amount of current flowing through a drive coil of the motor. The control circuit comprises a reference voltage circuit that generates a reference voltage corresponding to a speed-specifying signal inputted to specify the rotational speed of the motor; a clamp circuit that limits the level of the reference voltage generated by the reference voltage circuit; a comparator that has a speed voltage corresponding to an actual rotational speed of the motor and the reference voltage limited in level by the clamp circuit applied thereto and compares the two; and a control signal generator that generates and outputs a control signal for controlling the amount of current flowing through the drive coil based on the comparing result of the comparator.

According to the present invention, there is provided a motor speed control circuit having improved accuracy in controlling motor speed.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

At least the following matters will be made clear by the explanation in the present specification and the description of the accompanying drawings.

<Motor Speed Control System>

An example of the configuration of a motor speed control system according to the present invention will be described based on FIG. 1 with reference to FIGS. 2 to 9 as needed.

Figure 1:
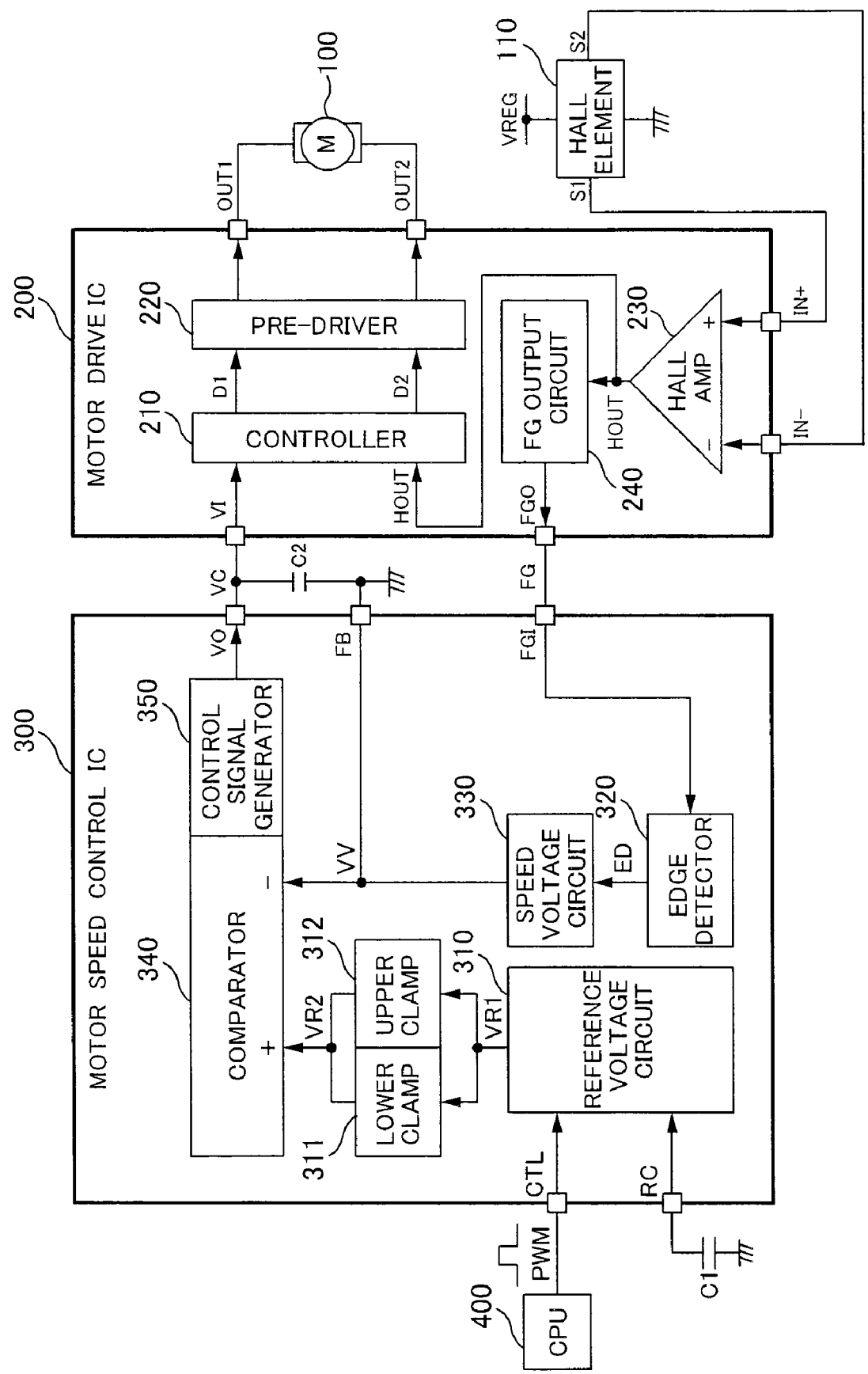
FIG. 1 is a diagram illustrating the configuration of a motor speed control system according to one implementation of the present invention.

The motor speed control system of FIG. 1 comprises a motor 100 to be controlled, a motor drive IC 200 (a first circuit of the invention), and a motor speed control IC 300 (a second circuit of the invention). That is, in this case, a motor speed control circuit according to the present invention comprises two chips of the one-chip integrated motor drive IC 200 and the one-chip integrated motor speed control IC 300. Note that the motor speed control circuit according to the present invention may be one chip into which the motor drive IC 200 and the motor speed control IC 300 are integrated.

The motor 100 is a so-called single-phase motor having a drive coil for a single phase, and further is a so-called hall motor having a hall element 110 fixed to its stator. The motor 100 is not limited to a single-phase hall motor, but a so-called three-phase hall motor having drive coils for three phases connected to be shaped like a star, a so-called sensor-less motor without a magnetic sensor such as the hall element 110, or the like can be adopted as the motor 100. The application of the motor 100 includes, for example, a fan motor for cooling a CPU mounted in a personal computer, a server or the like.

The hall element 110 generates rotational position detection signals S1, S2 which are shaped like a sine wave and opposite in phase to each other while the rotor of the motor 100 is rotating. The rotational position detection signals S1, S2 are a signal which renders the rotational position of the rotor detectable and whose frequency is proportional to the rotational speed of the motor 100. The rotational position detection signals S1, S2 output from the hall element 110 are input to IN+ and IN− terminals of the motor drive IC 200 respectively. The IN+ terminal is connected to the non-inverting input of a hall amplifier 230 inside the motor drive IC 200, and the IN− terminal is connected to the inverting input of the hall amplifier 230.

The motor drive IC 200 is an integrated circuit that drives the motor 100, and has terminals OUT1 and OUT2 that are connected to both ends of the drive coil of the motor 100; the IN+ and IN− terminals to which are input the rotational position detection signals S1, S2 from the hall element 110; a VI terminal to which is input a control signal VC from a VO terminal of the motor speed control IC 300; and an FGO terminal which outputs an FG signal to an FGI terminal of the motor speed control IC 300. The motor drive IC 200 comprises a controller 210, a pre-driver 220, the hall amplifier 230, and an FG output circuit 240.

The controller 210 controls the rotational speed of the motor 100 by varying the amount of current flowing through the drive coil of the motor 100 on the basis of the control signal VC input to the VI terminal of the motor drive IC 200 from the VO terminal of the motor speed control IC 300. Furthermore, the controller 210 generates switching control signals D1, D2 for controlling the switching of the direction of the current through the drive coil of the motor 100, based on the output HOUT of the hall amplifier 230.

The pre-driver 220 together with the drive coil of the motor 100 connected to the terminals OUT1 and OUT2 of the motor drive IC 200 constitutes a so-called H bridge circuit, where two transistor pairs that complementarily switch on/off and the drive coil are connected to be shaped like a letter H. The pre-driver 220 switches the direction of the current through the drive coil of the motor 100 by complementarily turning on/off the two transistor pairs of the H bridge circuit on the basis of the switching control signals D1, D2 supplied from the controller 210.

The hall amplifier 230 generates and outputs a hall amp output HOUT as a result of amplifying the differential of the rotational position detection signals S1, S2 from the hall element 110. The hall amp output HOUT is supplied to the controller 210 and the FG output circuit 240.

The FG output circuit 240 generates and outputs the FG signal having a frequency corresponding to the actual rotational speed of the motor 100 based on the hall amp output HOUT from the hall amplifier 230. That is, the hall amp output HOUT indicates the rotational position of the rotor actually detected. Hence, intervals at which the predetermined position of the rotor is detected can be monitored via the hall amp output HOUT. Thus, the FG output circuit 240 generates the FG signal having a frequency corresponding to the actual rotational speed of the motor 100 based on the detection intervals for the predetermined position of the rotor, monitored via the hall amp output HOUT. The FG signal is input to the FGI terminal of the motor speed control IC 300 via the FGO terminal of the motor drive IC 200.

Figure 2:
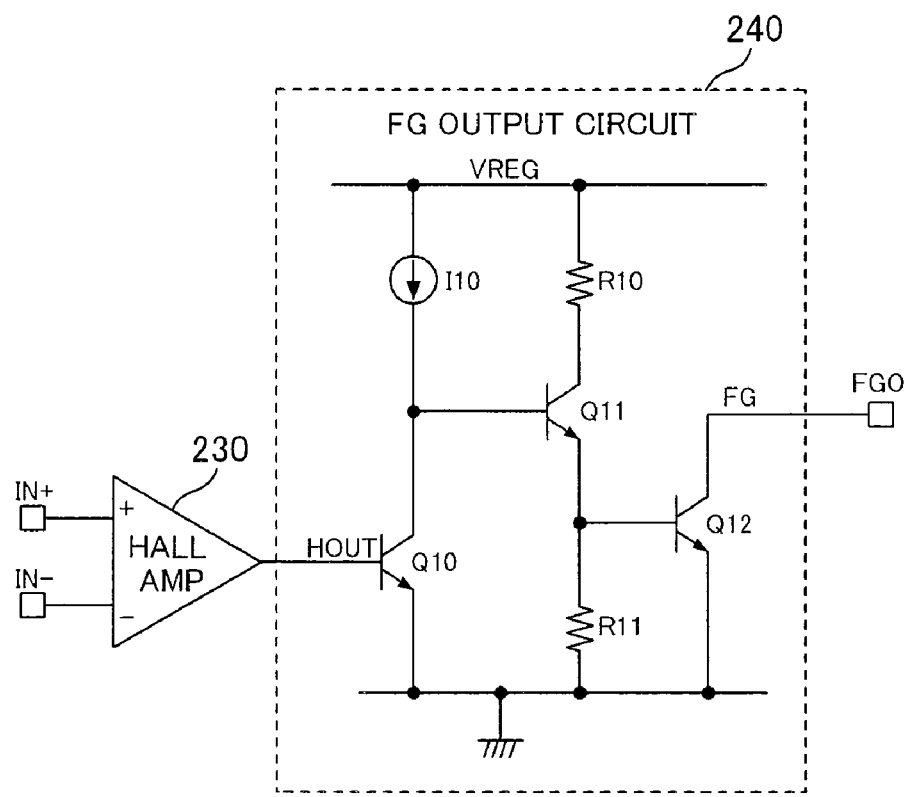
FIG. 2 is a diagram illustrating the configuration of an FG output circuit according to the implementation of the present invention.

An implementation of the circuit configuration of the FG output circuit 240 will be described based on FIG. 2.

The hall amp output HOUT from the hall amplifier 230 is supplied to the base electrode of an emitter-grounded NPN transistor Q10. The collector electrode of the NPN transistor Q10 is connected to a current source 110 and to the base electrode of an NPN transistor Q11. The NPN transistor Q11 has its collector electrode connected to a resistor R10 and its emitter electrode connected to a resistor R11 and to an emitter-grounded NPN transistor Q12. The FG signal is output through the FGO terminal connected to the collector electrode of the NPN transistor Q12.

In this configuration of the FG output circuit 240, if the hall amp output HOUT is at a High (H) level logically, the NPN transistor Q10 turns on thereby pulling the base electrode of the NPN transistor Q11 toward ground voltage, so that the NPN transistor Q11 turns off. Hence, the base electrode of the NPN transistor Q12 is pulled to ground voltage via a resistor R11, thereby turning off the NPN transistor Q12. Thus, in this case, the FG signal becomes the H level logically. On the other hand, if the hall amp output HOUT is at a Low (L) level logically, the NPN transistors operate in ways opposite to the above, thereby turning on the NPN transistor Q12. Thus, in this case, the FG signal becomes the L level logically. As such, the FG signal emerges as a pulse signal that corresponds in logical level and frequency to the hall amp output HOUT.

The motor speed control IC 300 has a CTL terminal to which is input a speed-specifying signal from a CPU 400 and an RC terminal to which is externally connected a smoothing capacitor C1 for smoothing the speed-specifying signal. The motor speed control IC 300 further has the FGI terminal to which is input the FG signal from the FGO terminal of the motor drive IC 200; the VO terminal which outputs the control signal VC to the VI terminal of the motor drive IC 200; and an FB terminal through which the control signal VC output from the VO terminal is fed back to the inverting input of a comparator 340 via a capacitor C2. The motor speed control IC 300 further has a reference voltage circuit 310, a lower clamp circuit 311, an upper clamp circuit 312, an edge detector 320, a speed voltage circuit 330, the comparator 340, and a control signal generator 350.

The reference voltage circuit 310 generates and outputs a reference voltage VR1 having a level corresponding to the speed-specifying signal input to the CTL terminal.

Figure 3:
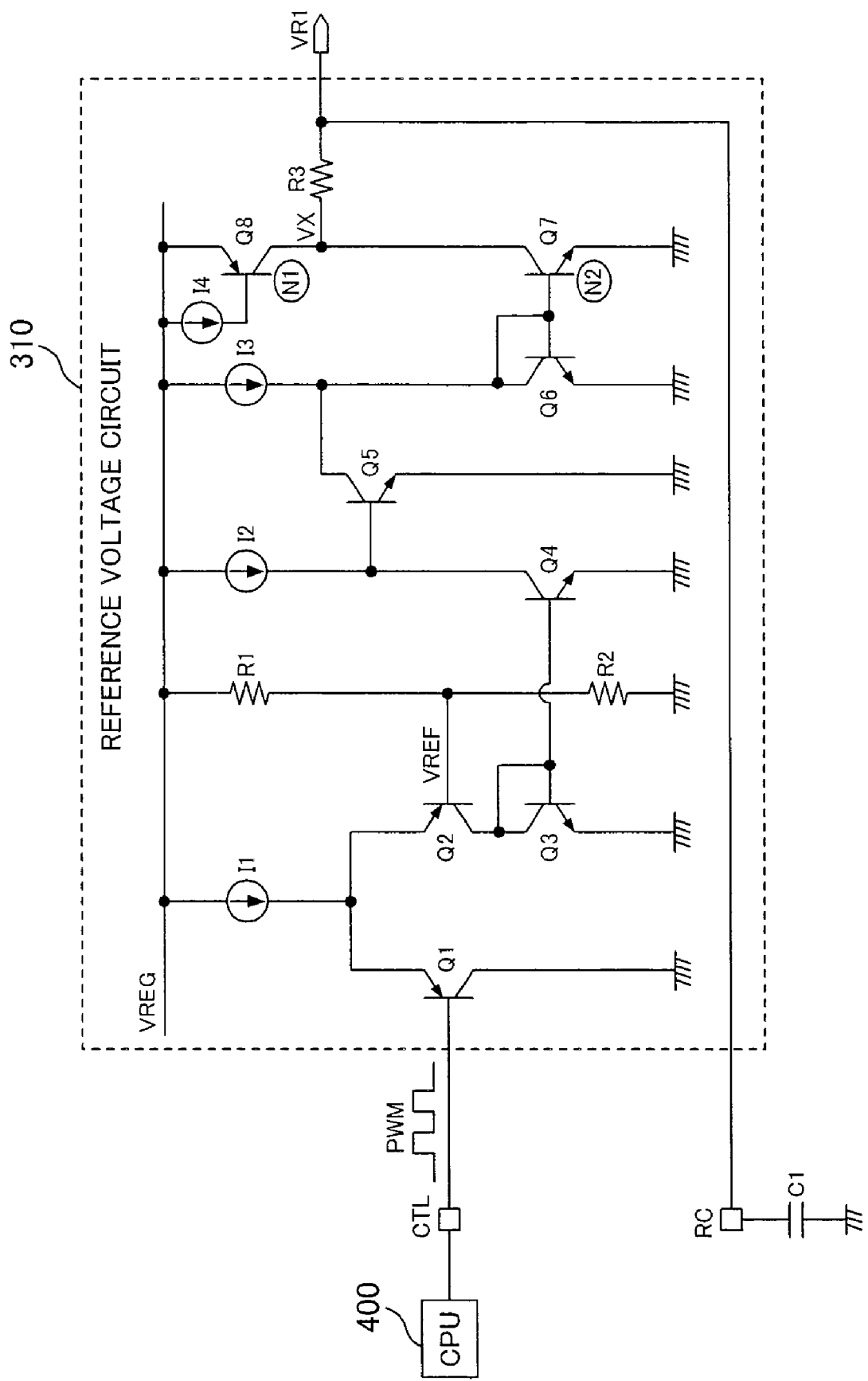
FIG. 3 is a diagram illustrating the configuration of a reference voltage circuit according to the implementation of the present invention.

Here, an implementation of the circuit configuration of the reference voltage circuit 310 will be described based on FIG. 3.

This is the case where the CTL terminal is connected communication-feasibly to the CPU 400 that controls the entire motor speed control system overall. A PWM (Pulse Width Modulation) signal set by the CPU 400 is input as the speed-specifying signal to the CTL terminal. Note that the PWM signal sets the rotational speed of the motor 100 via its duty ratio. Moreover, the smoothing capacitor C1 is connected to the RC terminal and together with a resistor R3 forms an RC filter circuit.

A transistor pair of PNP transistors Q1, Q2 have their emitter electrodes connected in common and to a current source I1. The PWM signal from the CTL terminal is supplied to the base electrode of the PNP transistor Q1, and a referenced voltage VREF, produced by division of a bias voltage VREG between resistors R1 and R2 connected in series, is applied to the base electrode of the PNP transistor Q2. The collector and base electrodes of the PNP transistor Q2 are short-circuited to form a diode and connected to an emitter-grounded NPN transistor Q3. The base electrode of the NPN transistor Q3 is connected to the base electrode of an emitter-grounded NPN transistor Q4 so that the NPN transistors Q3 and Q4 form a so-called current-mirror circuit.

The collector electrode of the NPN transistor Q4 is connected to a current source I2 and to the base electrode of an emitter-grounded NPN transistor Q5. The collector electrode of the NPN transistor Q5 is connected to a current source I3 and to a diode-connected, emitter-grounded NPN transistor Q6. The base electrode of the NPN transistor Q6 is connected to the base electrode of an NPN transistor Q7 so that the NPN transistors Q6 and Q7 form a so-called current-mirror circuit. The NPN transistor Q7 is connected in series to a PNP transistor Q8 having its base electrode connected to a current source I4. Note that the transistor size N2 of the PNP transistor Q8 is set greater than the transistor size N1 of the NPN transistor Q7 and that the NPN transistor Q7 is higher in capability of sinking a current. The connection point of the PNP transistor Q8 and the NPN transistor Q7 is connected to the resistor R3. A pulsed voltage VX at the connection point of the PNP transistor Q8 and the NPN transistor Q7 is smoothed by an RC filter circuit consisting of the resistor R3 and the smoothing capacitor C. The smoothed pulsed voltage VX is taken out as the reference voltage VR1.

In this configuration of the reference voltage circuit 310, if the PWM signal is at the L level logically and lower in level than the referenced voltage VREF, the PNP transistor Q1 turns on such that a greater current flows through the PNP transistor Q1 than through the PNP transistor Q2, and thus the NPN transistors Q3, Q4 turn off. As a result, a current from the current source I2 flows into the base electrode of the NPN transistor Q5 turning on, and the base electrode of the NPN transistor Q6 is pulled toward ground voltage via the NPN transistor Q5. Thus, the NPN transistors Q6, Q7 turn off and the PNP transistor Q8 becomes ON. Hence, the pulsed voltage VX is pulled toward the bias voltage VREG and becomes the H level. This pulsed voltage VX is smoothed by the RC filter circuit consisting of the resistor R3 and the smoothing capacitor C to produce the reference voltage VR1.

On the other hand, if the PWM signal is at the H level logically and higher in level than the referenced voltage VREF, the transistors operate in ways opposite to the above, thereby turning on the PNP transistor Q8 and the NPN transistor Q7. Note that since the NPN transistor Q7 is higher in capability of sinking a current than the PNP transistor Q8, the pulsed voltage VX is pulled toward ground voltage and becomes the L level logically. This pulsed voltage VX is smoothed by the RC filter circuit consisting of the resistor R3 and the smoothing capacitor C to produce the reference voltage VR1.

In this way, the reference voltage circuit 310 converts the PWM signal input to the CTL terminal into the pulsed voltage VX having a voltage swing of from the bias voltage VREG to ground voltage GND. And the reference voltage circuit 310 has the RC filter circuit of the resistor R3 and the smoothing capacitor C smooth the pulsed voltage VX to output a direct-current voltage corresponding to the duty ratio of the PWM signal as the reference voltage VR1.

The relationship between the PWM signal and the reference voltage VR1 is that when the PWM signal is at the L level logically, the reference voltage VR1 becomes high, and when the PWM signal is at the H level logically, the reference voltage VR1 becomes low. Hence, if the on-duty of the PWM signal is set greater to accelerate the motor 100, the reference voltage VR1 becomes low, and if the on-duty of the PWM signal is set smaller to decelerate the motor 100, the reference voltage VR1 becomes high. In other words, when the reference voltage VR1 generated by the reference voltage circuit 310 is at the H level logically, the motor 100 is being decelerated, and when the reference voltage VR1 is at the L level logically, the motor 100 is being accelerated. Needless to say, the relationship between the PWM signal and the reference voltage VR1 may be set to be the opposite in high/low.

The lower clamp circuit 311 and the upper clamp circuit 312 are clamp circuits that, while the reference voltage circuit 310 applies the reference voltage VR1 to the comparator 340, limit the level of the reference voltage VR1 depending on the range of the common-mode input voltage between the non-inverting and inverting inputs of the comparator 340. Hereinafter, the reference voltage VR1 whose level has been limited is called a clamped voltage VR2.

The lower clamp circuit 311 limits the lower limit of the reference voltage VR1 to be at or above the lower limit of the common-mode input voltage range of the comparator 340.

Figure 4:
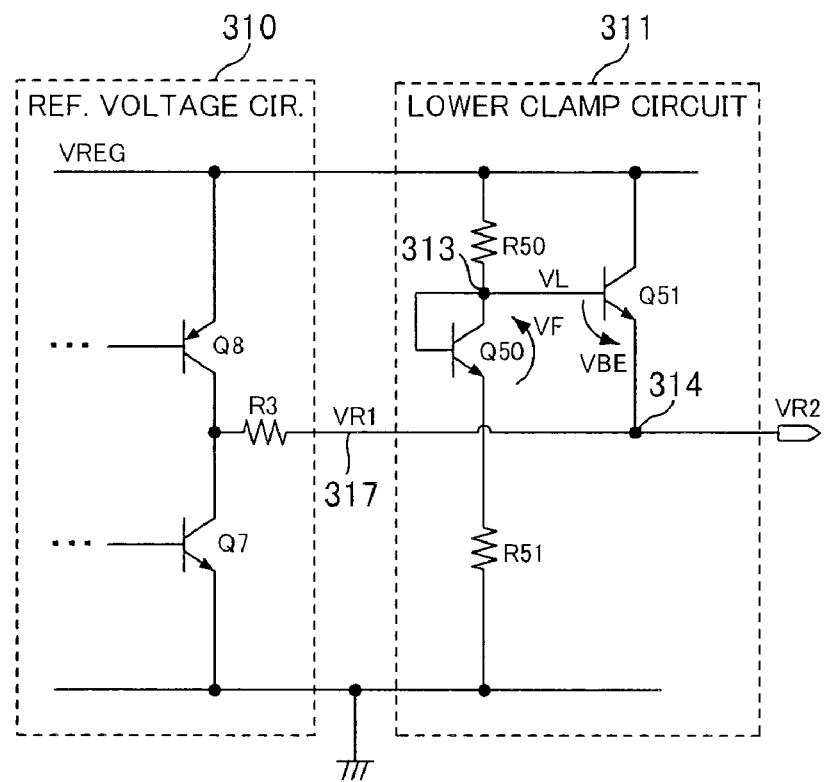
FIG. 4 is a diagram illustrating the configuration of a lower clamp circuit according to the implementation of the present invention.

Here, FIG. 4 shows an implementation of the lower clamp circuit 311.

In the lower clamp circuit 311, between the bias voltage VREG and ground voltage GND, there is provided a series connection of a resistor R50, a diode-connected NPN transistor Q50 (where the collector and base electrodes are short-circuited), and a resistor R51. The bias voltage VREG is applied to this series connection. As a result, divided voltages of the bias voltage VREG according to their resistances occur across the resistors R50 and R51, and a forward voltage VF occurs from the emitter electrode (cathode) to the collector electrode (anode) of the NPN transistor Q50. Hereinafter, the voltage at the connection point 313 of the resistor R50 and the collector electrode of the NPN transistor Q50 is called a lower clamp voltage VL.

The lower clamp circuit 311 further has an NPN transistor Q51 of which the lower clamp voltage VL of the connection point 313 is applied to the base electrode, the reference voltage VR1 from the reference voltage circuit 310 is applied via an applying line 317 to the emitter electrode, and the bias voltage VREG is applied to the collector electrode. Note that the NPN transistors Q50, Q51 have both base electrodes connected in common and form a so-called current-mirror circuit. The voltage at the connection point 314 of the emitter electrode of the NPN transistor Q51 and the applying line 317 for the reference voltage VR1 becomes the clamped voltage VR2 subject to lower limitation under a condition.

In the configuration of the lower clamp circuit 311, if the reference voltage VR1 and thus the voltage at the connection point 314 are relatively high, the base-to-emitter voltage VBE of the NPN transistor Q51 is below the threshold voltage, so that the NPN transistor Q51 remains off. In this case, the reference voltage VR1 is output, as it is, as the clamped voltage VR2 without limitation.

On the other hand, as the reference voltage VR1 and thus the voltage at the connection point 314 approach ground voltage GND, the base-to-emitter voltage VBE of the NPN transistor Q51 becomes higher than the threshold voltage, and the NPN transistor Q51 turns on. At this time, the voltage at the connection point 314 is lower by the base-to-emitter voltage VBE of the NPN transistor Q51 than the lower clamp voltage VL of the connection point 313 and is output as the clamped voltage VR2. Note that the forward voltage VF of the NPN transistor Q50 and the base-to-emitter voltage VBE of the NPN transistor Q51 are of the same characteristic and are opposite in direction, so that they approximately cancel out. Hence, the clamped voltage VR2 coincides with the lower clamp voltage VL depending on only the resistances of the resistors R50, R51. Even if the reference voltage VR1 tries to further approach ground voltage GND, the reference voltage VR1 is limited so as not to be below the lower clamp voltage VL.

Thus, by adjusting the resistances of the resistors R50, R51 as needed, the lower clamp voltage VL can be set no lower than the lower limit of the common-mode input voltage range, predetermined in specification, of the comparator 340. Therefore, the reference voltage VR1 lower than the lower limit of the common-mode input voltage range of the comparator 340 is prevented from being supplied from the reference voltage circuit 310 to the comparator 340.

The upper clamp circuit 312 limits the upper limit of the reference voltage VR1 to be at or below the upper limit of the common-mode input voltage range of the comparator 340.

Figure 5:
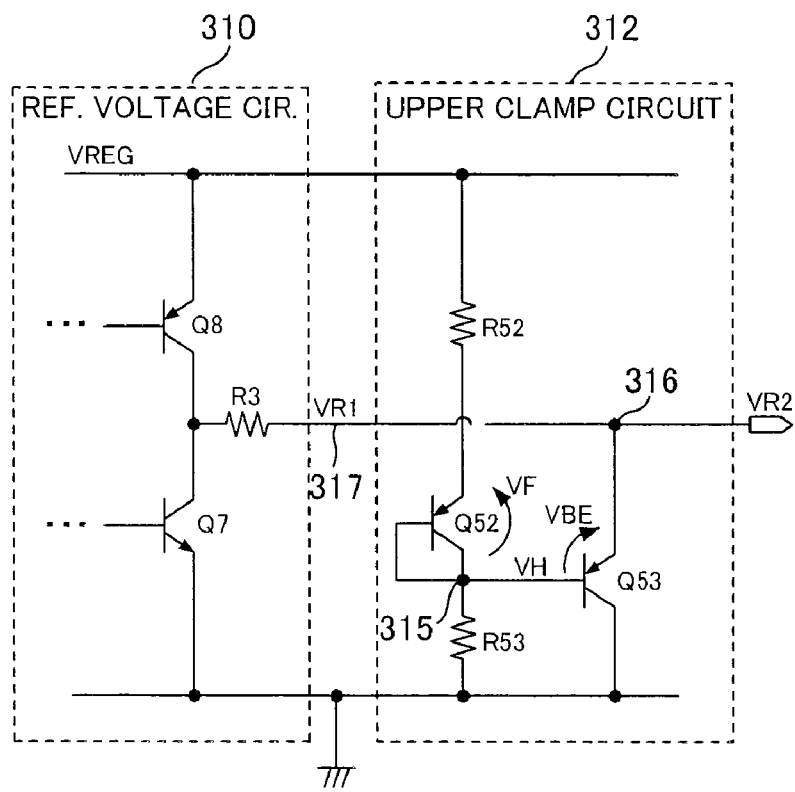
FIG. 5 is a diagram illustrating the configuration of an upper clamp circuit according to the implementation of the present invention.

Here, FIG. 5 shows an implementation of the upper clamp circuit 312.

In the upper clamp circuit 312, between the bias voltage VREG and ground voltage GND, there is provided a series connection of a resistor R52, a diode-connected PNP transistor Q52 (where the collector and base electrodes are short-circuited), and a resistor R53. The bias voltage VREG is applied to this series connection. As a result, divided voltages of the bias voltage VREG according to their resistances occur across the resistors R52 and R53, and a forward voltage VF occurs from the collector electrode (cathode) to the emitter electrode (anode) of the PNP transistor Q52. Hereinafter, the voltage at the connection point 315 of the collector electrode of the PNP transistor Q52 and the resistor R53 is called an upper clamp voltage VH.

The upper clamp circuit 312 further has a PNP transistor Q53 of which the upper clamp voltage VH of the connection point 315 is applied to the base electrode, the reference voltage VR1 from the reference voltage circuit 310 is applied via the applying line 317 to the emitter electrode, and the collector electrode is grounded. Note that the PNP transistors Q52, Q53 have both base electrodes connected in common and form a so-called current-mirror circuit. The voltage at the connection point 316 of the emitter electrode of the PNP transistor Q53 and the applying line 317 for the reference voltage VR1 becomes the clamped voltage VR2 subject to upper limitation under a condition.

In the configuration of the upper clamp circuit 312, if the reference voltage VR1 and thus the voltage at the connection point 316 are relatively low, the base-to-emitter voltage VBE of the PNP transistor Q53 is below the threshold voltage, so that the PNP transistor Q53 remains off. In this case, the reference voltage VR1 is output, as it is, as the clamped voltage VR2 without limitation.

On the other hand, as the reference voltage VR1 and thus the voltage at the connection point 316 approach the bias voltage VREG, the base-to-emitter voltage VBE of the PNP transistor Q53 becomes higher than the threshold voltage, and the PNP transistor Q53 turns on. At this time, the voltage at the connection point 316 is higher by the base-to-emitter voltage VBE of the PNP transistor Q53 than the upper clamp voltage VH of the connection point 315 and is output as the clamped voltage VR2. Note that the forward voltage VF of the PNP transistor Q52 and the base-to-emitter voltage VBE of the PNP transistor Q53 are of the same characteristic and are opposite in direction, so that they approximately cancel out. Hence, the clamped voltage VR2 coincides with the upper clamp voltage VH depending on only the resistances of the resistors R52, R53. Even if the reference voltage VR1 tries to further approach the bias voltage VREG, the reference voltage VR1 is limited so as not to be above the upper clamp voltage VH.

Thus, by adjusting the resistances of the resistors R52, R53 as needed, the upper clamp voltage VH can be set no higher than the upper limit of the common-mode input voltage range, predetermined in specification, of the comparator 340. Therefore, the reference voltage VR1 higher than the upper limit of the common-mode input voltage range of the comparator 340 is prevented from being supplied from the reference voltage circuit 310 to the comparator 340.

The FG signal input from the FGO terminal to the FGI terminal is supplied to the edge detector 320. The edge detector 320 detects both edges in the FG signal and in response thereto, produces and outputs an edge signal ED having a narrower pulse width than that of the FG signal ((a) and (b) of FIG. 7).

The edge signal ED output from the edge detector 320 is supplied to the speed voltage circuit 330. Here, the frequency of the edge signal ED is corresponding to the rotational speed of the motor 100. Hence, the speed voltage circuit 330 produces a speed voltage VV corresponding to the rotational speed of the motor 100 based on the edge signal ED.

Figure 6:
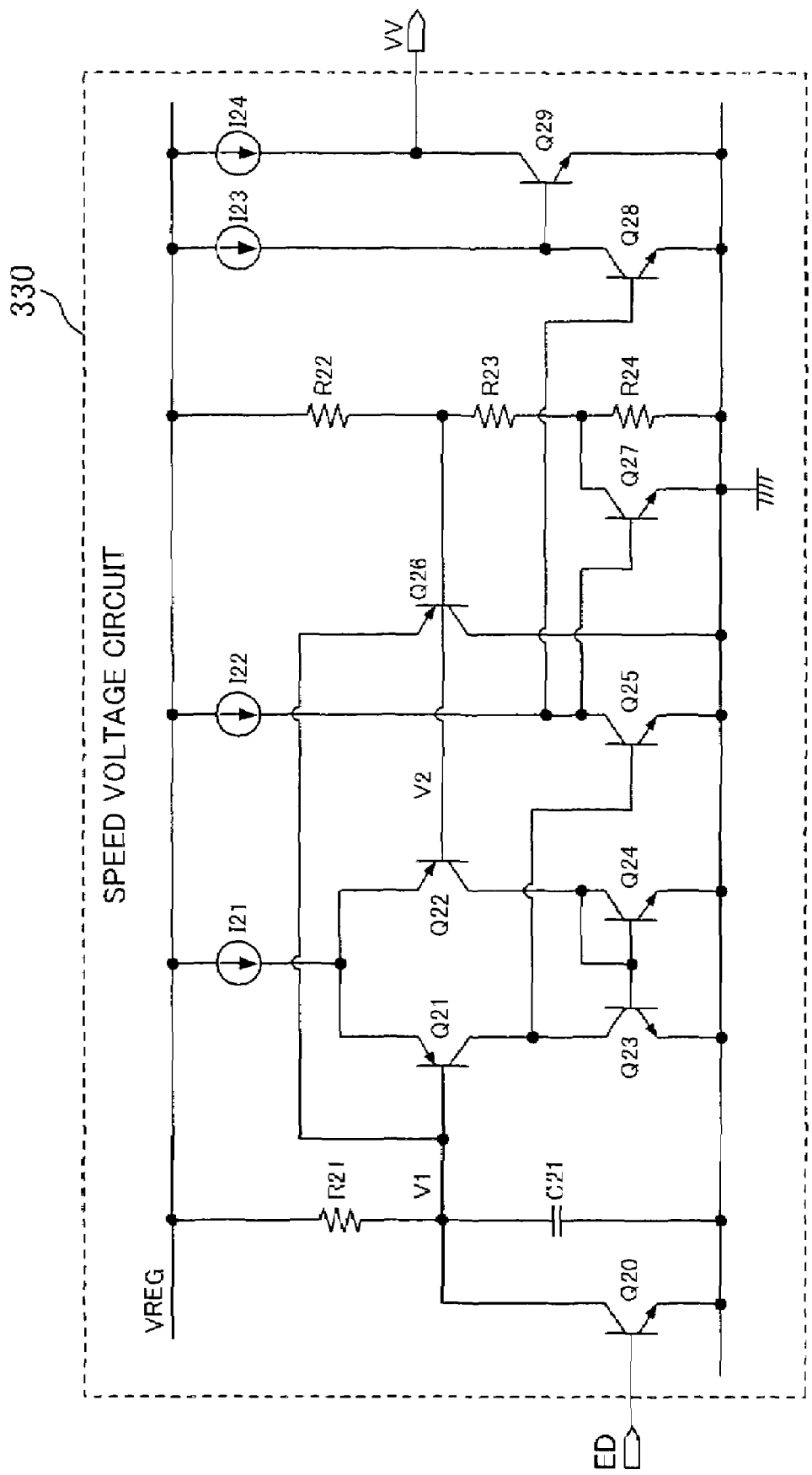
FIG. 6 is a diagram illustrating the configuration of a speed voltage circuit according to the implementation of the present invention.

Here, an implementation of the circuit configuration of the speed voltage circuit 330 will be described with reference to FIG. 6.

The series connection of a resistor R21 and a capacitor C21 has the bias voltage VREG applied thereto, and an emitter-grounded NPN transistor Q20 is connected in parallel with the capacitor C21. The edge signal ED is supplied to the base electrode of the NPN transistor Q20.

A transistor pair of PNP transistors Q21, Q22 has both emitter electrodes connected in common and to a current source 121. A charge/discharge voltage V1 of the capacitor C21 is applied to the base electrode of the PNP transistor Q21, and a divided voltage V2 produced by division of the bias voltage VREG between resistors R22 and R23, R24 connected in series is applied to the base electrode of the PNP transistor Q22. The collector electrodes of the transistor pair of PNP transistors Q21, Q22 are connected to a so-called current-mirror circuit consisting of an NPN transistor Q23 and a diode-connected NPN transistor Q24. The base electrode of the PNP transistor Q21 is connected to the emitter electrode of an NPN transistor Q26 having its collector grounded and the divided voltage V2 applied to its base electrode.

The connection point of the PNP transistor Q21 and the NPN transistor Q23 is connected to an emitter-grounded NPN transistor Q25. The collector electrode of the NPN transistor Q25 is connected to a current source 122, to an emitter-grounded NPN transistor Q27 connected in parallel with a resistor R24, and to the base electrode of an emitter-grounded NPN transistor Q28. The collector electrode of the NPN transistor Q28 is connected to a constant current source 123 and to the base electrode of an emitter-grounded NPN transistor Q29. The collector electrode of the NPN transistor Q29 is connected to a constant current source 124. The pulsed, speed voltage VV is output from the connection point of the constant current source 124 and the NPN transistor Q29.

In this configuration of the speed voltage circuit 330, when the edge detector 320 is not detecting an edge of the FG signal and thus the edge signal ED supplied to the base electrode of the NPN transistor Q20 is at the L level, the NPN transistor Q20 is OFF and thus the capacitor C21 is charged. If the charge/discharge voltage V1 applied to the base electrode of the PNP transistor Q21 is higher than the divided voltage V2 by the series connection of the resistors R22, R23, R24, a smaller current flows through the PNP transistor Q21 than through the PNP transistor Q22. Thus, the NPN transistor Q25 turns toward being off; the NPN transistor Q28 turns toward being on; and the NPN transistor Q29 turns toward being off. Thus, the speed voltage VV is pulled toward the bias voltage VREG and becomes the H level logically (see (b), (c) of FIG. 7).

On the other hand, where the edge detector 320 is detecting an edge of the FG signal and thus the edge signal ED supplied to the base electrode of the NPN transistor Q20 is at the H level, the transistors operate in ways opposite to the above and thereby the NPN transistor Q29 turns toward being on. Thus, the speed voltage VV is pulled toward ground voltage and becomes the L level logically (see (b), (c) of FIG. 7).

The L width (width of the L level) of the speed voltage VV corresponding to an edge of the FG signal detected is decided by an RC time constant of the resistor R21 and the capacity C21. Thus, the L width of the speed voltage VV is constant as long as the RC time constant is fixed even when the rotational speed of the motor 100 varies. However, the pulse period of the speed voltage VV varies because the pulse period of the FG signal and thus that of the edge signal ED vary with the rotational speed of the motor 100. Hence, a DC voltage produced by integrating the speed voltage VV varies with the rotational speed of the motor 100. For example, when the rotational speed of the motor 100 is higher, the pulse period of the FG signal is shorter, and the L width per period of the speed voltage VV is greater, thus lowering the DC voltage produced by integrating the speed voltage VV. On the other hand, when the rotational speed of the motor 100 is lower, the pulse period of the FG signal is longer, and the L width per period of the speed voltage VV is smaller, thus raising the DC voltage produced by integrating the speed voltage vv.

The comparator 340 compares the reference voltage VR1 (i.e., the clamped voltage VR2) whose level is limited by the lower clamp circuit 311 and the upper clamp circuit 312 to within the range of from the lower clamp voltage VL to the upper clamp voltage VH and the DC voltage produced by integrating the pulsed speed voltage VV generated by the speed voltage circuit 330. The control signal generator 350 produces and outputs a control signal VC for controlling the amount of current flowing through the drive coil of the motor 100 by the motor drive IC 200 based on the comparing result of the comparator 340.

Figure 9:
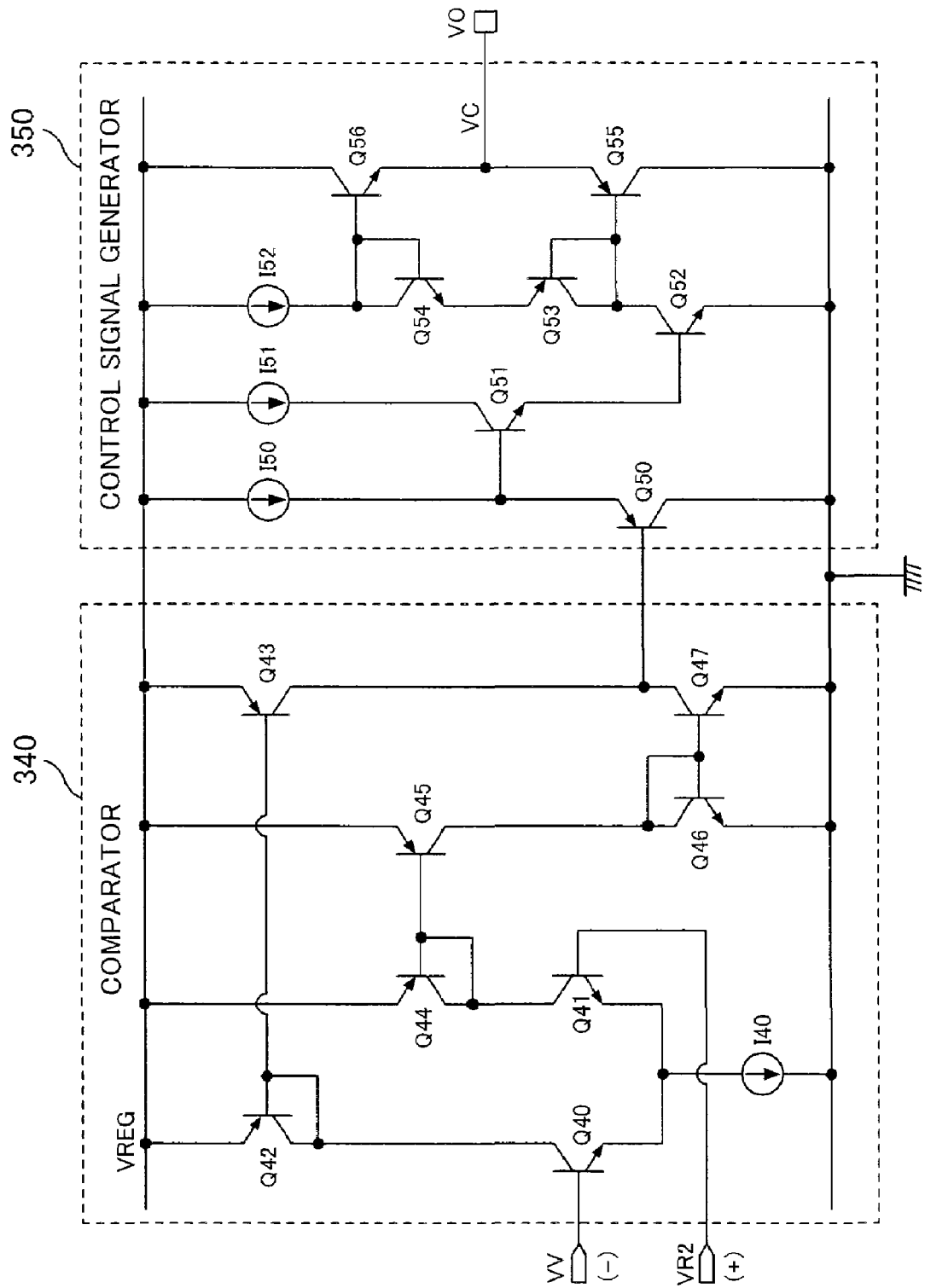
FIG. 9 is a diagram illustrating the configuration of a comparator and a control signal generator according to the implementation of the present invention.
Figure 10:
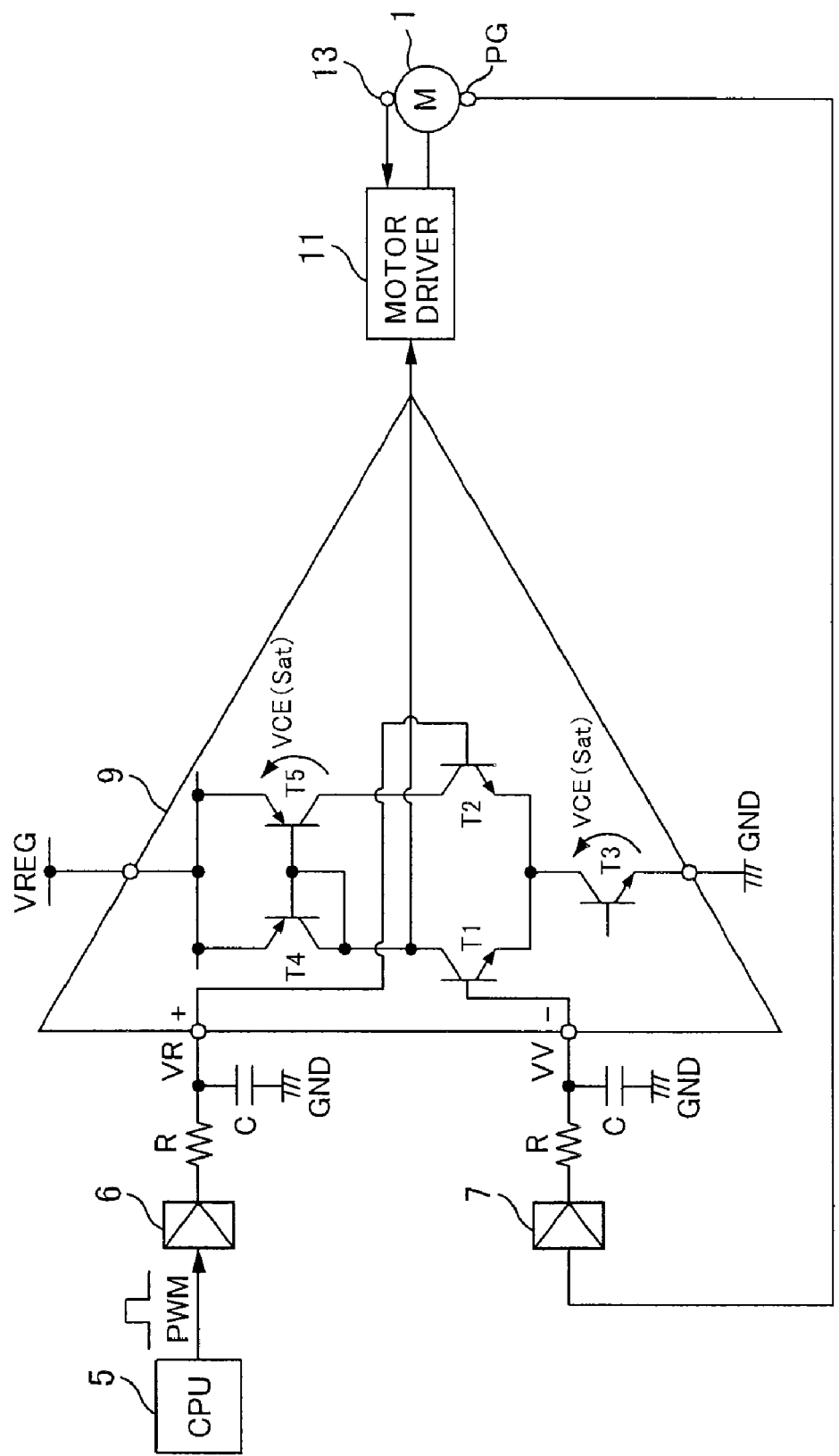
FIG. 10 is a diagram illustrating the configuration of a conventional motor speed control system.
Figure 11:
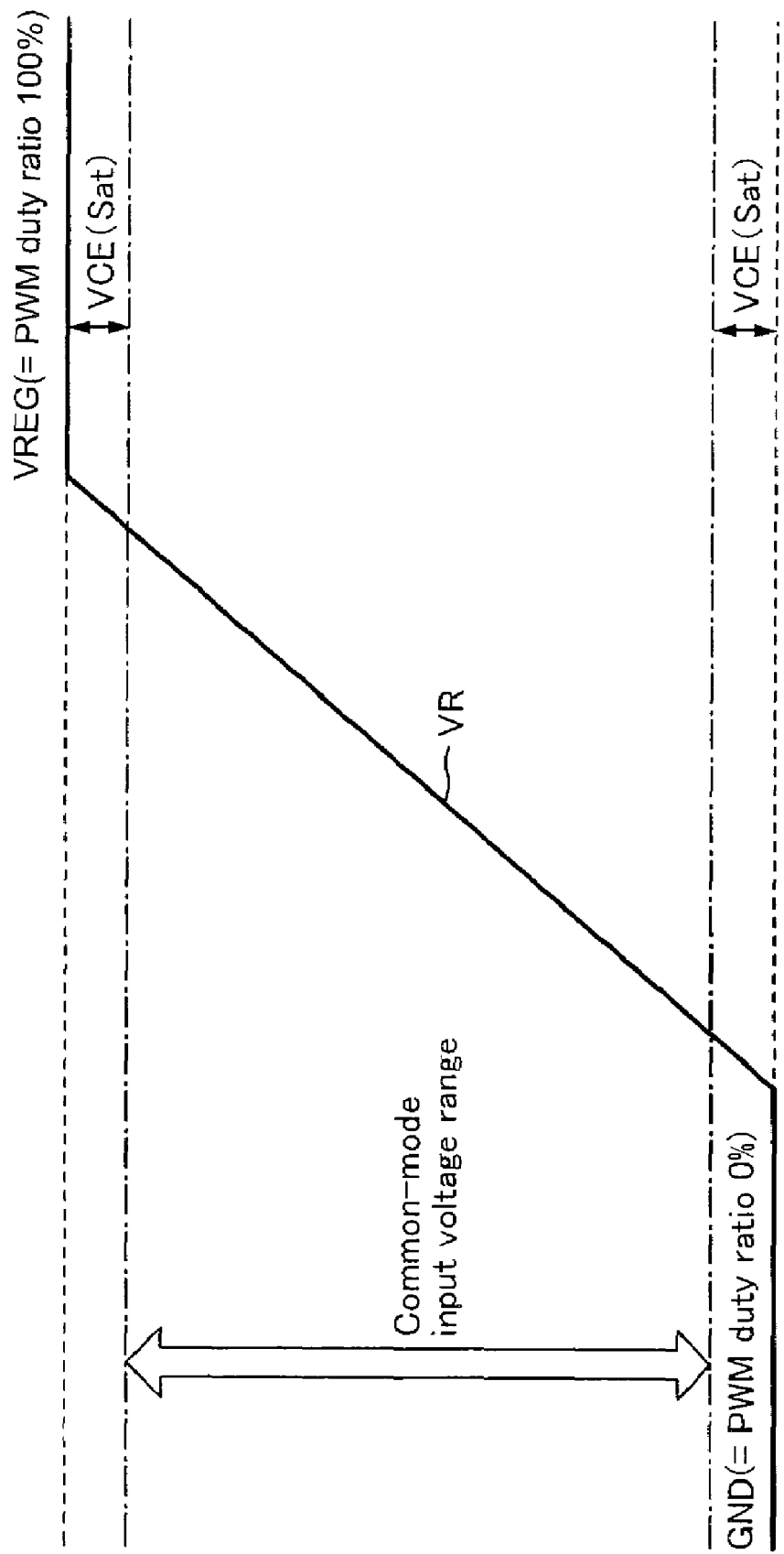
FIG. 11 is a diagram showing the level variation of a reference voltage VR in response to change in a PWM signal in the conventional motor speed control system.

Here, an implementation of the circuit configuration of the comparator 340 and the control signal generator 350 will be described with reference to FIG. 9.

A transistor pair of NPN transistors Q40, Q41 has both emitter electrodes connected in common and to a current source 140. The speed voltage VV from the speed voltage circuit 330 is applied to the base electrode of the NPN transistor Q40 (the inverting input of the comparator 340), and the clamped voltage VR2 from the lower clamp circuit 311 and the upper clamp circuit 312 is applied to the base electrode of the NPN transistor Q41 (the non-inverting input of the comparator 340). The speed voltage VV that is applied to the base electrode of the NPN transistor Q40 is an integrated DC voltage across a capacitor C2 connected between the VO terminal and FB terminal.

The collector electrode of the NPN transistor Q40 is connected to a diode-connected PNP transistor Q42 having the bias voltage VREG applied to its emitter electrode. The base electrode of the PNP transistor Q42 and the base electrode of the PNP transistor Q43 having the bias voltage VREG applied to its emitter electrode are connected in common so that the PNP transistors Q42, Q43 form a so-called current-mirror circuit.

The collector electrode of the NPN transistor Q41 is connected to a diode-connected PNP transistor Q44 having the bias voltage VREG applied to its emitter electrode. The base electrode of the PNP transistor Q44 and the base electrode of the PNP transistor Q45 having the bias voltage VREG applied to its emitter electrode are connected in common so that the PNP transistors Q44, Q45 form a so-called current-mirror circuit.

The collector electrode of the PNP transistor Q45 is connected to an emitter-grounded, diode-connected NPN transistor Q46. The base electrode of the NPN transistor Q46 and the base electrode of the NPN transistor Q47 connected in series with the PNP transistor Q43 and having its emitter grounded are connected in common so that the NPN transistors Q46, Q47 form a so-called current-mirror circuit.

The collector electrode of the NPN transistor Q47 is connected to the base electrode of a PNP transistor Q50 having its collector grounded. The emitter electrode of the PNP transistor Q50 is connected to a current source 150 and to the base electrode of an NPN transistor Q51. The collector electrode of the NPN transistor Q51 is connected to a current source 151 and the emitter electrode of the NPN transistor Q51 is connected to the base electrode of an emitter-grounded NPN transistor Q52.

The collector electrode of the NPN transistor Q52 is connected to a diode-connected PNP transistor Q53. The base electrode of the PNP transistor Q53 and the base electrode of a PNP transistor Q55 having its collector grounded are connected in common so that the PNP transistors Q53, Q55 form a so-called current-mirror circuit.

The emitter electrode of the PNP transistor Q53 is connected to a diode-connected NPN transistor Q54. The collector electrode of the NPN transistor Q54 is connected to a current source 152, and the base electrodes of the NPN transistor Q54 and of an NPN transistor Q56 are connected in common so that the NPN transistors Q54, Q56 form a so-called current-mirror circuit.

The NPN transistor Q56 and the PNP transistor Q55 having their emitter electrodes connected in common form a series connection, and the control signal VC is output through the VO terminal connected to the connection point of the NPN transistor Q56 and the PNP transistor Q55.

In this configuration of the comparator 340 and of the control signal generator 350, when the speed voltage VV applied to the base electrode of the NPN transistor Q40 is higher than the clamped voltage VR2 applied to the base electrode of the NPN transistor Q41, that is, when the actual rotational speed of the motor 100 is lower than the rotational speed specified by the PWM signal (in an instruct-to-accelerate state), a greater current flows through the NPN transistor Q40 than through the NPN transistor Q41. Thus, greater currents flow through the current-mirror circuit (Q42, Q43) than through the current-mirror circuit (Q46, Q47). Hence, the base electrode of the PNP transistor Q50 is pulled toward the bias voltage VREG, and the PNP transistor Q50 turns toward being off. As a result, the NPN transistors Q51, Q52 turns toward being on, thereby lowering the level of the control signal VC.

On the other hand, when the speed voltage VV applied to the base electrode of the NPN transistor Q40 is lower than the clamped voltage VR2 applied to the base electrode of the NPN transistor Q41, that is, when the actual rotational speed of the motor 100 is higher than the rotational speed specified by the PWM signal (in an instruct-to-decelerate state), the transistors operate in ways opposite to the above, and thus the NPN transistors Q51, Q52 turns toward being off, thereby raising the level of the control signal VC.

Figures 7, 8:
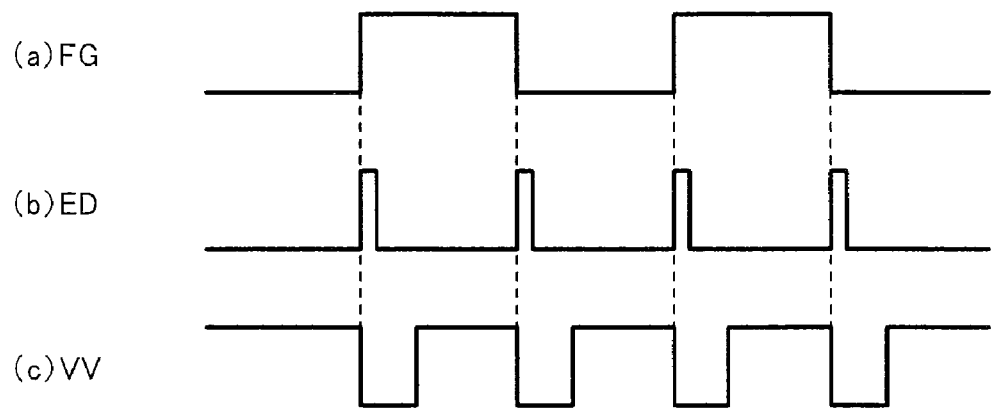
FIG. 7 is a diagram showing the waveforms of main signals of an edge detector and the speed voltage circuit according to the implementation of the present invention.
FIG. 8 is for explaining motor speed control according to the implementation of the present invention.

The control signal VC is used as a control voltage for the motor drive IC 200. As to the logic of the motor drive IC 200, when the level of the control signal VC is high, the rotational speed of the motor 100 is decelerated, and when the level of the control signal VC is low, the rotational speed of the motor 100 is accelerated. In this case, the motor speed control IC 300 performs motor speed control as shown in FIG. 8.

To describe in detail, in the state where the speed voltage VV is higher than the clamped voltage VR2 (the instruct-to-accelerate state), the control signal VC output from the motor speed control IC 300 continues to descend in level. Meanwhile, the rotational speed of the motor 100 continues to ascend. As a result, the level of the speed voltage VV gradually descends and approaches that of the clamped voltage VR2. On the other hand, in the state where the speed voltage VV is lower than the clamped voltage VR2 (the instruct-to-decelerate state), the control signal VC output from the motor speed control IC 300 continues to ascend in level. Meanwhile, the rotational speed of the motor 100 continues to descend. As a result, the level of the speed voltage VV gradually ascends and approaches that of the clamped voltage VR2. In this way, the motor speed control IC 300 compares the clamped voltage VR2 and the speed voltage VV and controls the level of the control signal VC, the control voltage for the motor drive IC 200, such that the levels of both the voltages coincide.

<Effect of Providing the Upper Clamp Circuit>

In the case where the CPU 400 has set the duty ratio of the PWM signal to 0% so as to completely stop the motor 100 and supplies the PWM signal to the CTL terminal of the motor speed control IC 300, the reference voltage VR1 generated by the reference voltage circuit 310 is close to the bias voltage VREG (the H level logically) as mentioned above. Meanwhile, the reference voltage VR1 is subjected to limitation by the upper clamp circuit 312 so as not to exceed the upper clamp voltage VH that is set no higher than the upper limit of the common-mode input voltage range of the comparator 340 before being applied to the non-inverting input of the comparator 340. Thus, the problem that the motor drive IC 200 accelerates the motor 100 although instructed to stop the motor 100 is reliably solved. That is, by providing the upper clamp circuit 312, accuracy in controlling the motor 100 to stop is improved.

<Effect of Providing the Lower Clamp Circuit>

In the case where the CPU 400 has set the duty ratio of the PWM signal to 100% so as to run the motor 100 at full speed and supplies the PWM signal to the CTL terminal of the motor speed control IC 300, the reference voltage VR1 generated by the reference voltage circuit 310 is close to the ground voltage GND (the L level logically) as mentioned above. Meanwhile, the reference voltage VR1 is subjected to limitation by the lower clamp circuit 311 so as not to go below the lower clamp voltage VL that is set no lower than the lower limit of the common-mode input voltage range of the comparator 340 before being applied to the non-inverting input of the comparator 340. Thus, the problem that the motor drive IC 200 decelerates the motor 100 although instructed to run the motor 100 at full speed is reliably solved. That is, by providing the lower clamp circuit 311, accuracy in controlling the motor 100 to run at full speed is improved.

An opposite logic to the above may be used in which if the reference voltage VR1 becomes the H level logically (near the bias voltage VREG), the motor 100 is accelerated and if the reference voltage VR1 becomes the L level logically (near ground voltage GND), the motor 100 is decelerated. In this case, the upper clamp circuit 312 improves accuracy in controlling the motor 100 to accelerate and the lower clamp circuit 311 improves accuracy in controlling the motor 100 to decelerate.

Although the preferred implementation of the present invention has been described, the above implementation is provided to facilitate the understanding of the present invention and not intended to limit the present invention. It should be understood that various changes and alterations can be made therein without departing from the spirit and scope of the invention and that the present invention includes its equivalents.

What is claimed is:

1. A motor speed control circuit which controls a rotational speed of a motor by controlling an amount of current flowing through a drive coil of the motor, comprising:
    a reference voltage circuit that generates a reference voltage corresponding to a speed-specifying signal inputted to specify the rotational speed of the motor;
    a clamp circuit that limits a level of the reference voltage generated by the reference voltage circuit;
    a comparator that has a speed voltage corresponding to an actual rotational speed of the motor and the reference voltage limited in level by the clamp circuit applied thereto and compares the two; and
    a control signal generator that generates and outputs a control signal for controlling the amount of current flowing through the drive coil based on the comparing result of the comparator,
    the clamp circuit limiting the level of the reference voltage to be applied to the comparator to within a common-mode input voltage range of the comparator while the control signal generator generates and outputs the control signal for controlling the amount of current flowing through the drive coil based on the comparing results of the comparator.

2. The motor speed control circuit according to claim 1, wherein the clamp circuit is a lower clamp circuit that limits a lower limit level of the reference voltage to no lower than a lower limit of the common-mode input voltage range.

3. The motor speed control circuit according to claim 1, wherein the clamp circuit is an upper clamp circuit that limits an upper limit level of the reference voltage to no higher than an upper limit of the common-mode input voltage range.

4. The motor speed control circuit according to claim 1, wherein the clamp circuit has:
    a lower clamp circuit that limits a lower limit level of the reference voltage to no lower than a lower limit of the common-mode input voltage range; and
    an upper clamp circuit that limits an upper limit level of the reference voltage to no higher than an upper limit of the common-mode input voltage range.

5. The motor speed control circuit according to claim 2, wherein the lower clamp circuit comprises:
    a series connection having a number of resistors to which a bias voltage is applied; and
    an NPN transistor of which a divided voltage produced by division of the bias voltage by the series connection is applied to a base electrode, the reference voltage is applied to an emitter electrode, and the bias voltage is applied to a collector electrode,
    wherein the lower limit level of the reference voltage is limited based on the divided voltage.

6. The motor speed control circuit according to claim 3, wherein the upper clamp circuit comprises:
    a series connection having a number of resistors to which a bias voltage is applied; and
    a PNP transistor of which a divided voltage produced by division of the bias voltage by the series connection is applied to a base electrode, the reference voltage is applied to an emitter electrode, and a collector electrode is grounded,
    wherein the upper limit level of the reference voltage is limited based on the divided voltage.

7. The motor speed control circuit according to any of claims 1 and 2 to 6, comprising two chips of:
    a first circuit integrated into one chip that makes a current flow through the drive coil of the motor thereby driving the motor; and
    a second circuit integrated into the other chip that includes the reference voltage circuit; the clamp circuit; the comparator; and the control signal generator, and controls the amount of current flowing through the drive coil of the motor via the first circuit according to the control signal generated by the control signal generator thereby controlling the rotational speed of the motor.

8. The motor speed control circuit according to any of claims 1 and 2 to 5, which is an integrated chip of:
    a first circuit that makes a current flow through the drive coil of the motor thereby driving the motor; and
    a second circuit that includes the reference voltage circuit; the clamp circuit; the comparator; and the control signal generator, and controls the amount of current flowing through the drive coil of the motor via the first circuit according to the control signal generated by the control signal generator thereby controlling the rotational speed of the motor.

* * * * *

UNITED STATES PATENT AND TRADEMARK OFFICE
CERTIFICATE OF CORRECTION

PATENT NO.       : 7,420,340 B2
APPLICATION NO.  : 11/468277
DATED            : September 2, 2008
INVENTOR(S)      : Ogino et al.

It is certified that error appears in the above-identified patent and that said Letters Patent is hereby corrected as shown below:

Column 5, line 17: replace "110" with --I10--.

Column 6, line 15: replace "12" with --I2--.

Column 6, line 17: replace "13" with --I3--.

Column 6, line 24: replace "14" with --I4--.

Column 6, line 40: replace "12" with --I2--.

Column 9, line 38: replace "121" with --I21--.

Column 9, line 54: replace "122" with --I22--.

Column 9, line 59: replace "123" with --I23--.

Column 9, line 61: replace "124" with --I24--.

Column 9, line 63: replace "124" with --I24--.

Column 10, line 55: replace "140" with --I40--.

Column 11, line 24: replace "150" with --I50--.

Column 11, line 27: replace "151" with --I51--.

UNITED STATES PATENT AND TRADEMARK OFFICE
CERTIFICATE OF CORRECTION

PATENT NO. : 7,420,340 B2
APPLICATION NO. : 11/468277
DATED : September 2, 2008
INVENTOR(S) : Ogino et al.

It is certified that error appears in the above-identified patent and that said Letters Patent is hereby corrected as shown below:

Column 11, line 39: replace "152" with --I52--.

Signed and Sealed this

Second Day of December, 2008

JON W. DUDAS
*Director of the United States Patent and Trademark Office*